United States Patent
Wang et al.

(10) Patent No.: US 11,921,413 B2
(45) Date of Patent: Mar. 5, 2024

(54) PROJECTION SCREEN AND PROJECTION SYSTEM

(71) Applicant: APPOTRONICS CORPORATION LIMITED, Guangdong (CN)

(72) Inventors: Lin Wang, Shenzhen (CN); Wei Sun, Shenzhen (CN); Jie Wang, Shenzhen (CN); Fei Hu, Shenzhen (CN); Yi Li, Shenzhen (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 327 days.

(21) Appl. No.: 17/280,784

(22) PCT Filed: Aug. 14, 2019

(86) PCT No.: PCT/CN2019/100483
§ 371 (c)(1),
(2) Date: Mar. 26, 2021

(87) PCT Pub. No.: WO2020/063156
PCT Pub. Date: Apr. 2, 2020

(65) Prior Publication Data
US 2021/0341827 A1    Nov. 4, 2021

(30) Foreign Application Priority Data
Sep. 27, 2018  (CN) .......................... 201811128808.2

(51) Int. Cl.
*G03B 21/602*    (2014.01)
*G02B 3/00*      (2006.01)
(Continued)

(52) U.S. Cl.
CPC ......... *G03B 21/602* (2013.01); *G02B 3/0056* (2013.01); *G02B 5/003* (2013.01);
(Continued)

(58) Field of Classification Search
CPC .... G03B 21/602; G03B 21/625; G03B 21/60; G03B 21/62; G03B 21/0056; G02B 5/003; G02B 5/0284
(Continued)

(56) References Cited

U.S. PATENT DOCUMENTS 3,408,132 A * 10/1968 Chandler ............... G03B 21/60
                                                        359/451
4,906,070 A *  3/1990 Cobb, Jr. ................ F21V 5/002
                                                        359/834
(Continued)

FOREIGN PATENT DOCUMENTS

CN    1670618    9/2005
CN    1693989    11/2005
(Continued)

OTHER PUBLICATIONS

International Search Report for International Application PCT/CN2019/100483, dated Nov. 14, 2019.
(Continued)

*Primary Examiner* — Stephanie E Bloss
*Assistant Examiner* — Kevin C Butler
(74) *Attorney, Agent, or Firm* — Burris Law, PLLC

(57) ABSTRACT

A projection screen and a projection system using the projection screen. The projection screen includes a microstructure layer and a light absorbing layer sequentially stacked from the side where a projected light is introduced. The microstructure layer includes multiple microstructure units. Each microstructure unit includes one reflective surface and one lens surface opposite the reflective surface; moreover, the reflective surface is provided at a position matching the focus of the lens surface. The projection screen and the projection system can resist ambient light and have a high gain and a high contrast.

20 Claims, 7 Drawing Sheets

(51) Int. Cl.
*G02B 5/00* (2006.01)
*G02B 5/02* (2006.01)
*G03B 21/60* (2014.01)
*G03B 21/62* (2014.01)
*G03B 21/625* (2014.01)

(52) U.S. Cl.
CPC ........... *G02B 5/0284* (2013.01); *G03B 21/60* (2013.01); *G03B 21/62* (2013.01); *G03B 21/625* (2013.01)

(58) Field of Classification Search
USPC ........................................................ 359/455
See application file for complete search history.

(56) References Cited

U.S. PATENT DOCUMENTS

| | | | | |
|---|---|---|---|---|
| 6,707,605 | B2 * | 3/2004 | Sekiguchi | G03B 21/625 |
| | | | | 359/457 |
| 6,844,969 | B2 * | 1/2005 | Cho | G03B 21/56 |
| | | | | 359/459 |
| 7,262,911 | B2 * | 8/2007 | Niwa | G03B 21/60 |
| | | | | 359/461 |
| 7,835,078 | B2 * | 11/2010 | Ichikawa | G03B 21/60 |
| | | | | 359/449 |
| 7,852,556 | B2 * | 12/2010 | Huang | G03B 21/10 |
| | | | | 359/457 |
| 7,869,126 | B2 * | 1/2011 | Akiyama | G03B 21/60 |
| | | | | 359/454 |
| 8,384,995 | B2 * | 2/2013 | Hirata | G03B 21/10 |
| | | | | 359/453 |
| 8,922,895 | B1 * | 12/2014 | Weber | G02B 5/09 |
| | | | | 359/627 |
| 9,022,575 | B2 * | 5/2015 | Hsu | G03B 21/62 |
| | | | | 359/461 |
| 11,079,668 | B1 * | 8/2021 | Baumgart | G03B 21/58 |
| 11,175,498 | B2 * | 11/2021 | Ohyama | B60K 35/00 |
| 11,194,243 | B2 * | 12/2021 | Wang | G03B 21/60 |
| 11,221,553 | B2 * | 1/2022 | Wang | G02B 5/09 |
| 2004/0240054 | A1 * | 12/2004 | Aiura | G03B 21/56 |
| | | | | 359/455 |
| 2009/0207488 | A1 * | 8/2009 | Akiyama | G03B 21/60 |
| | | | | 359/455 |
| 2010/0091366 | A1 * | 4/2010 | Shiau | G03B 21/60 |
| | | | | 359/455 |
| 2015/0362832 | A1 * | 12/2015 | Chuang | G03B 21/602 |
| | | | | 359/455 |
| 2020/0401034 | A1 * | 12/2020 | Wang | G03B 21/60 |
| 2021/0191249 | A1 * | 6/2021 | Wang | G02B 5/0284 |
| 2021/0341827 | A1 * | 11/2021 | Wang | G02B 5/003 |
| 2021/0389657 | A1 * | 12/2021 | Wang | G02B 5/22 |
| 2022/0014718 | A1 * | 1/2022 | Baumgart | G02B 27/0977 |
| 2022/0075250 | A1 * | 3/2022 | Wang | G03B 21/56 |

FOREIGN PATENT DOCUMENTS

| | | | | |
|---|---|---|---|---|
| CN | 1771462 | | 5/2006 | |
| CN | 1815351 | | 8/2006 | |
| CN | 1815351 | A * | 8/2006 | ............. G03B 21/10 |
| CN | 1875320 | | 12/2006 | |
| CN | 100492163 | C * | 5/2009 | ............. G03B 21/56 |
| CN | 102023471 | | 4/2011 | |
| CN | 103345112 | | 10/2013 | |
| CN | 103676449 | | 3/2014 | |
| CN | 203587956 | | 5/2014 | |
| CN | 105408777 | | 3/2016 | |
| CN | 105607405 | | 5/2016 | |
| CN | 105607405 | A * | 5/2016 | ........... G03B 21/602 |
| CN | 105785703 | | 7/2016 | |
| CN | 205910490 | | 1/2017 | |
| CN | 205910490 | U * | 1/2017 | ............. G03B 21/60 |
| CN | 105607405 | | 8/2017 | |
| CN | 207216263 | | 4/2018 | |
| CN | 207216263 | U * | 4/2018 | |
| CN | 108153102 | | 6/2018 | |
| CN | 111624844 | A * | 9/2020 | |
| CN | 112180670 | A * | 1/2021 | ............. G03B 21/56 |
| EP | 3663852 | A1 * | 6/2020 | ............... G02B 5/02 |
| FR | 2909703 | * | 12/2012 | ............... E06B 9/24 |
| JP | H1138509 | A * | 2/1999 | ............. G03B 21/60 |
| JP | 2949844 | B2 * | 11/1999 | ............. G03B 21/62 |
| JP | 2001042251 | A * | 2/2001 | .......... G02B 27/2228 |
| JP | 3371304 | * | 11/2002 | ............... B23K 26/00 |
| JP | 2006065266 | | 3/2006 | |
| JP | 4539738 | | 9/2010 | |
| JP | 2010262046 | A * | 11/2010 | |
| JP | 2012252226 | * | 12/2012 | ................ G02B 3/08 |
| JP | 2012252226 | A * | 12/2012 | |
| JP | 2014115589 | A * | 6/2014 | |
| JP | 2015060193 | | 3/2015 | |
| JP | 2022165753 | A * | 11/2022 | |
| JP | 2022165755 | A * | 11/2022 | |
| WO | WO-2019024368 | A1 * | 2/2019 | ............... G02B 5/02 |
| WO | WO-2019227935 | A1 * | 12/2019 | ............. G03B 21/60 |
| WO | WO-2020063156 | A1 * | 4/2020 | ............... G02B 3/08 |
| WO | WO-2020078189 | A1 * | 4/2020 | ............. G02B 3/0012 |
| WO | WO-2020114224 | A1 * | 6/2020 | ........... G02B 3/0006 |
| WO | WO-2021000792 | A1 * | 1/2021 | ............. G03B 21/56 |

OTHER PUBLICATIONS

Office Action issued in corresponding CN Application 201811128808. 2, dated Aug. 27, 2021, and English Translation, 6 pages.

Extended / Supplementary Search Report issued in corresponding EP Application 19864965.9, dated May 31, 2022, 6 pages.

* cited by examiner

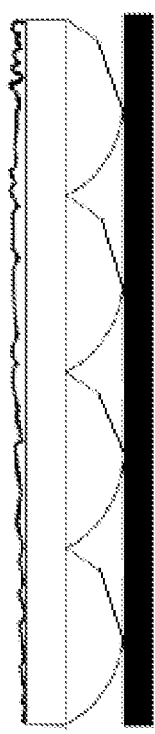 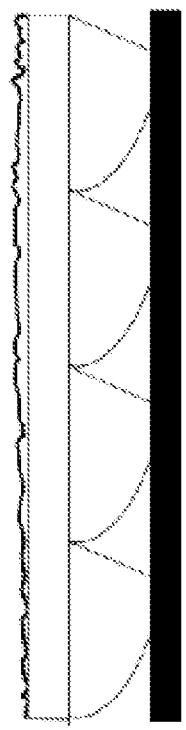 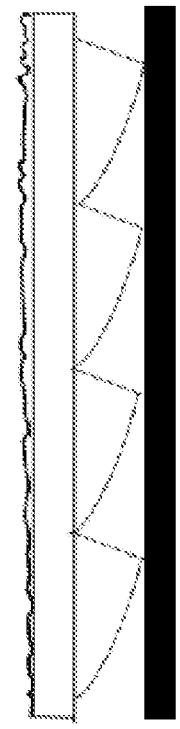
FIG. 7a    FIG. 7b    FIG. 7c
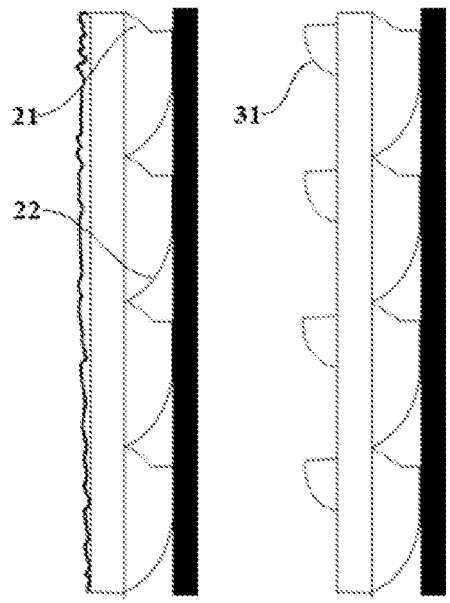
FIG. 8a    FIG. 8b

PROJECTION SCREEN AND PROJECTION SYSTEM

CROSS-REFERENCE TO RELATED APPLICATIONS

This application is a National Phase of International Application No. PCT/CN2019/100483, filed on Aug. 14, 2019, which claims priority to and the benefit of CN 201811128808.2, filed on Sep. 27, 2018. The disclosures of the above applications are incorporated herein by reference.

FIELD

The present disclosure relates to a projection screen and a projection system. Particularly, the present disclosure relates to a projection screen capable of resisting ambient light and improving contrast and a projection system using the projection screen.

BACKGROUND

The statements in this section merely provide background information related to the present disclosure and may not constitute prior art.

In recent years, with continuous improvement of the brightness of projectors, projection display systems have been more and more widely used. And the screen is an important part of the projection display system and has a great influence on the image quality of the projection display system.

Usually, contrast of the screen is an important parameter to evaluate the quality of a screen. In the application scene of the screen, in addition to projection light from the projector, light incident on the screen often further includes ambient light in the surrounding environment. The existing projection screen can reflect both the projection light and the ambient light. Therefore, due to the influence of ambient light, the contrast of the finally displayed image after the reflection of the screen is generally much lower than the contrast of the projector itself.

In order to improve the contrast of the screen when the screen is in an application scene with ambient light, some solutions have been proposed. As shown in FIG. 1a, Chinese Patent Application No. CN1670618A proposes a wire grid screen including microstructure units. The microstructure unit includes two inclined surfaces, the upper inclined surface is coated with black light-absorbing material and used for absorbing the ambient light coming from the above of the screen, and the lower inclined surface is a reflective resin substrate and used for reflecting the projection light. In addition, as shown in FIG. 1b, Chinese Patent Application No. CN1693989A also proposes a wire grid screen including microstructure units. The collimating effect of the wire grid structure gradually decreases from the middle to two sides, and the reflective surface has no selectivity for the angle of the incident light. This allows the ambient light to be reflected to the viewer's view field, and at the same time the gain of the screen is generally less than 0.5.

In addition, as shown in FIG. 1c, a circular-symmetrical Fresnel structure screen is proposed in a Chinese Patent Application No. CN105408777A. The screen uses the different incident angles of projection light and ambient light to improve contrast. The array microstructure of the screen includes a lens surface 32 and a non-lens surface 33. An angle between the lens surface 32 and the plane of the screen is smaller than an angle between the non-lens surface 33 and the plane of the screen. The drawing shows the optical paths of the projection light L1 and the ambient light G1 and G2 that are respectively incident at relatively large angles. The projection light L1 is only incident on the lens surface 32 with a small incident angle. The ambient light G2 is reflected to a direction towards the ground after being reflected by the upper reflective surface of the reflective layer, which does not affect the viewing contrast, but a part of the ambient light G1 as shown in the figure will be reflected back into the view field through a lower reflective surface of an emitting layer. Therefore, the structure in FIG. 1c has a limited effect in improving contrast.

SUMMARY

This section provides a general summary of the disclosure and is not a comprehensive disclosure of its full scope or all of its features.

The present disclosure provides a projection screen and a projection system that are capable of resisting ambient light and having high gain and high contrast.

According to one form of the present disclosure, a projection screen is disclosed. The projection screen includes a microstructure layer and a light absorbing layer that are sequentially stacked from an incident side of a projection light. The microstructure layer includes a plurality of microstructure units, each of the plurality of microstructure units includes a reflective surface and a lens surface opposite to the reflective surface, and the reflective surface is provided at a position matching a focus of the lens surface.

In some variations, the microstructure unit further includes a connecting surface connecting the reflective surface with the lens surface. In at least one variation, the connecting surface includes an upright surface in contact with the light absorbing layer. In some variations, the connecting surface further includes a horizontal surface directly connected to the reflective surface.

In at least one variation, an extension line of the reflective surface and a tangent line of any point on the lens surface of each of the plurality of microstructure units form an obtuse angle.

In some variations, each of the plurality of microstructure units is a microstructure unit and in each of the plurality of microstructure units, the lens surface and the reflective surface are a pair of total internal reflection surfaces provided for the projection light. Alternatively, each of the plurality of microstructure units is a specular reflective microstructure unit and in each of the plurality of microstructure units, each of the lens surface and the reflective surface is plated with a reflective layer.

In at least one variation, the lens surface has a curvature in an upright direction. In some variations, the reflective surface has a curvature in the upright direction.

In at least one variation, the plurality of microstructure units are distributed in a shape of annulus or a sector of annulus in a rotational symmetry manner in a plane of the projection screen.

In some variations, the projection screen further includes a microlens array located on a light incident side of the plurality of microstructure units and including a plurality of microlenses, the plurality of microlenses are arranged in one-to-one correspondence with the plurality of microstructure units, and the reflective surface is located on a focal plane of a corresponding microlens of the plurality of microlenses. In at least one variation, a surface of the microlens array is frosted.

In some variations, the projection screen further includes diffusion layer, located on a light incident side of the microstructure layer.

In at least one variation, a surface of the microstructure unit is frosted.

Assuming that a maximum pitch of each of the plurality of microstructure units is Pitch, and that a maximum length of a part of the microstructure unit excluding the reflective surface and the lens surface is T, an aperture factor AR of the microstructure unit is:

$$AR = \frac{T}{\text{Pitch}},$$

where a value of the aperture factor AR is within a range from 0.1 to for example in a range from 0.35 to 0.55.

Another form of the present disclosure further discloses a projection system. The system includes the above projection screen and a projector.

As described above, the projection screen and the projection system according to the present disclosure have at least following advantages.

(1) With the focusing effect of the lens surface of the microstructure layer, the duty ratio of the reflective surface that reflects the light to the viewer's view field is reduced, thereby reducing the overall reflectivity of the screen without affecting the reflection of the projection light, such that the screen has a high gain.

(2) The position of the reflective surface that reflects the light to the viewer's view field matches the position of the focal of the lens surface, and only the projection light from the bottom of the screen can be reflected to the viewer's view field. According to the principle of reversibility of the optical path, ambient light from other directions will be absorbed by the black light absorbing layer at the back side or be reflected out of the viewer's view field, so the anti-ambient light ability of the screen is significantly improved, the screen has a high contrast.

It should be understood that the beneficial effects of the present disclosure are not limited to the above-mentioned effects but may be any beneficial effects described herein.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 7 shows a variant structure of a microstructure unit of a projection screen according to one form of the present disclosure;

FIG. 8a shows a variant structure of a projection screen according to one form of the present disclosure;

FIG. 8b shows another variant structure of a projection screen according to one form of the present disclosure;

Figure 1A:
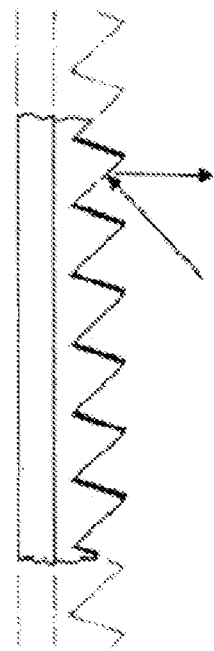
FIG. 1a shows a schematic diagram of a projection screen in the prior art.
Figure 1B:
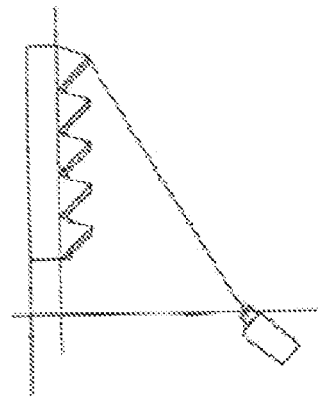
FIG. 1b shows a schematic diagram of another projection screen in the prior art.
Figure 1C:
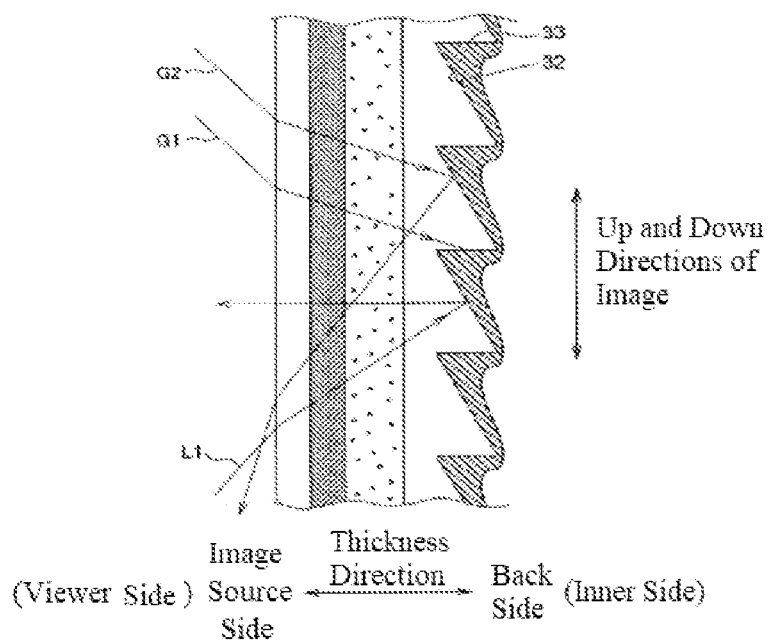
FIG. 1c shows a schematic diagram of still another projection screen in the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, specific forms of the present disclosure will be described in detail with reference to the accompanying drawings. It should be emphasized that all dimensions in the drawings are only schematic and are not necessarily illustrated in actual scale, and thus are not restrictive. For example, it should be understood that thicknesses and thickness ratios of respective layers in a multilayer structure and angles shown in the drawing are not shown according to actual dimensions and ratios and are only for convenience of illustration.

I. Overview of Projection System

Figure 2A:
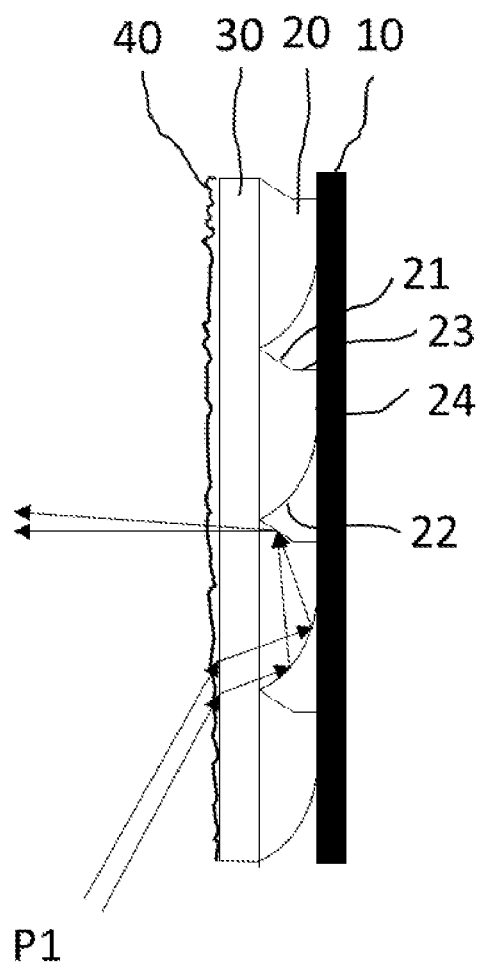
FIG. 2a shows a schematic diagram of projection screens according to forms of the present disclosure.
Figure 2B:
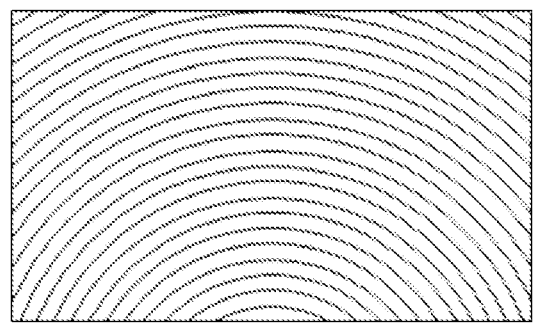
FIG. 2b shows a schematic diagram of projection screens according to forms of the present disclosure.

FIG. 2a and FIG. 2b shows schematic diagrams of a projection screen according to one form of the present disclosure. As shown in FIG. 2a, a projection screen includes a light absorbing layer 10, a microstructure layer 20, a substrate layer 30 and a diffusion layer 40. Projection light and ambient light can pass through the diffusion layer 40 and the substrate layer 30 and incident to the microstructure layer 20. Hereinafter, a light incident side of the projection screen is also referred to as an outer side of the screen (i.e., a side close to a viewer), and a light absorbing layer side is also referred to as an inner side of the screen (i.e., a side far away from a viewer).

The microstructure layer 20 forms a microstructure unit array including a large number of microstructure units repeatedly arranged. For example, as shown in FIG. 2b, the microstructure units of the microstructure layer 20 have a rotationally symmetrical annular array arranged structure on the plane of the screen. A rotation central (optical center) axis of the rotationally symmetrical array arranged structure is perpendicular to the plane of the screen and located below the middle of screen. In at least one variation, a projector constituting the projection system together with the projection screen is arranged on the rotation central axis. It should be understood that the microstructure units of the microstructure layer 20 can also be arranged in other ways, for example, arranged along the horizontal and vertical directions to form a two-dimensional matrix.

As shown in the cross-sectional view of FIG. 2a, each microstructure unit of the microstructure layer 20 includes a reflective surface 21 and a lens surface 22 opposite to the reflective surface 21. In FIG. 2a, the reflective surface 21 is located above and the lens surface 22 is located below. It should be understood that the positional relationship between the reflective surface and the lens surface is not limited to this, but can be arranged according to the position of a projector. Projection light from the lower part of the screen can enter the viewer's view field through continuous reflection by the lens surface 22 and the reflective surface 21.

In one form, the microstructure unit is a total internal reflection microstructure unit, and the reflective surface 21 and the lens surface 22 are a pair of total internal reflection surfaces arranged for the projection light. In addition, each microstructure unit further includes a connecting surface for connecting the reflective surface 21 with the lens surface 22. As shown in FIG. 2, the connecting surface can be, for example, a horizontal surface 23 perpendicular to the plane of the screen and an upright surface 24 parallel to the plane of the screen. The horizontal surface 23 is directly connected to the reflective surface 21, and the upright surface 24 is directly connected to the lens surface 22. The reflective surface 21 is arranged at a position matching the focus of the lens surface 22. For example, the reflective surface 21 is located near the focus of the lens surface 22 or passes through the focus of the lens surface 22. The lens surface 22, for example, can have a curvature in an upright direction. With such structure, as shown in FIG. 2, the projection light from below the screen is totally internally reflected by the lens surface 22 and at the same time is focused on the reflective surface 21, and is totally internally reflected by the reflective surface 21 again and then enters the view field of the viewer. As the ambient light from other directions does not meet the totally internally reflective condition, it will either pass through the microstructure layer 20 and be absorbed by the light absorbing layer 10 behind, or be reflected to a position outside the view field of the viewer, thereby improving the anti-ambient light performance of the entire screen. In addition, as will be explained in detail below, due to the a structure of the pair of total internal reflection surfaces formed by the lens surface and the reflective surface, the duty cycle of the reflective surface is reduced, and the overall reflectivity of the screen is reduced, but the reflection of the projection light is not affected, so that the screen structure has a high gain. In addition, in another form, the microstructure unit is a specular reflective microstructure unit. The difference from the above form is that the reflective surface 21 and the lens surface 22 are specular reflective surfaces. For example, the specular reflective surface can be formed with a method in which the reflective surface 21 and the lens surface 22 are plated with a reflective material such as metal to form a reflective layer. With such a structure, as shown in FIG. 2, the projection light from below the screen is reflected by the lens surface 22 and at the same time is focused on the reflective surface 21, and is reflected by the reflective surface 21 again and then enters the view field of the viewer. According to the reversibility of the optical path, ambient light from other directions will either pass through the upright surface 24 and be absorbed by the light absorbing layer 10 behind, or be reflected by the reflective surface 21 or the lens surface 22 to a position outside the view field of the viewer, thereby improving the anti-ambient light performance of the entire screen. In addition, as will be explained in detail below, due to the use of a structure in which the microstructure unit includes a pair of lens surfaces and a reflective surface that are arranged in cooperation, the duty cycle of the reflective surface is reduced, and the overall reflectivity of the screen is reduced, but the reflection of the projection light is not affected, so that the screen structure has a high gain. It should be noted that since the total internal reflection structure has stricter angle selection characteristics for reflected light, the screen with the total internal reflection microstructure unit has better anti-ambient light performance than the screen with the specular reflective microstructure unit.

The microstructure layer 20 can be formed into one-piece with the substrate layer 30. For example, a surface on one side of the substrate layer 30 is processed to form the microstructure layer 20. In other words, the substrate layer 30 and the microstructure layer 20 can also be collectively referred to as the microstructure layer.

The light absorbing layer 10 can absorb the light beam irradiated thereon. For example, the light absorbing layer 10 is a black light absorbing layer. In the example shown in FIG. 2, the light absorbing layer 10 is in contact with an upright surface 24 of the microstructure unit of the microstructure layer 20. In addition, an air gap or a planarization layer can be provided in a non-contact area between the light absorbing layer 10 and the microstructure layer 20.

The diffusion layer 40 is configured to diffuse the collimated light beam reflected from the microstructure layer 20, so that the projection screen has a larger view angle. In addition, a protective layer can be provided outside of the diffusion layer 40 to inhibit or prevent scratches or chemical corrosion. Of course, other auxiliary function layers can also be provided according to design needs.

II. Optical Principle and Angle Selection of Microstructure Unit

Figure 3:
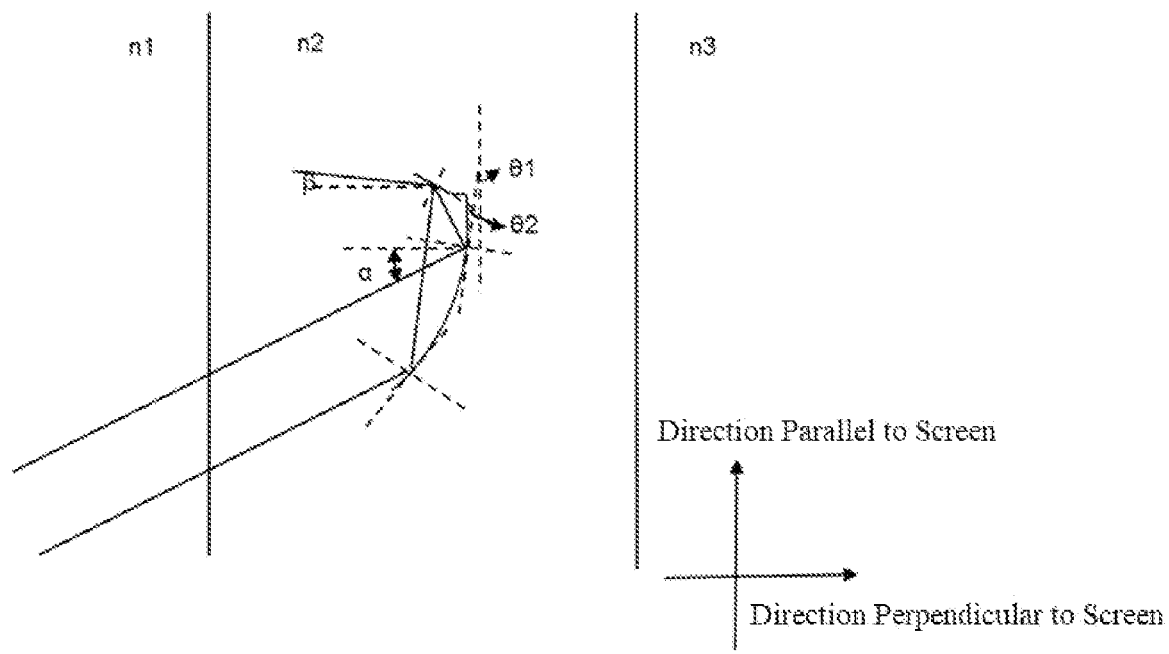
FIG. 3 is a schematic diagram showing a specific structure of a microstructure unit of a projection screen according to one form of the present disclosure.
Figure 4:
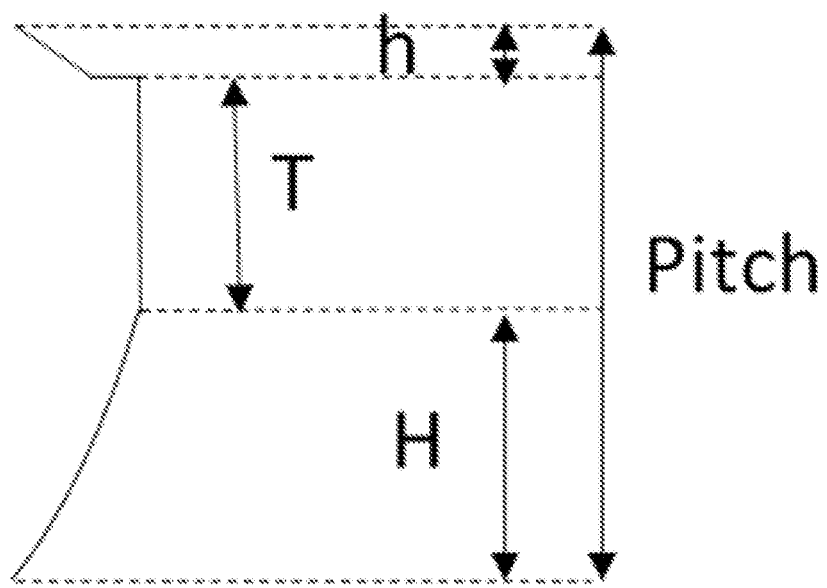
FIG. 4 is a schematic diagram showing sizes of each part of the microstructure unit.

As described above, the microstructure unit of the projection screen according to the present disclosure can be, for example, a total internal reflection microstructure unit or a specular reflective microstructure unit. Hereinafter, in the case where the microstructure unit of the projection screen according to the form of the present disclosure is a total internal reflection microstructure unit, the optical principle of the total internal reflection microstructure unit will be described in detail with reference to FIGS. 3 to 6. FIG. 3 shows an example of the optical path when the projection light from below the screen is incident to the microstructure unit of the projection screen according to the form of the present disclosure. FIG. 4 shows an aperture ratio of the microstructure unit of the projection screen according to one form of the present disclosure. FIG. 5 shows an example of the optical path when ambient light is incident to the projection screen. It should be noted that, for clear illustration, only part of the structure of the microstructure unit is shown in FIG. 3 and FIG. 4.

FIG. 3 shows an example of the optical path when the projection light below the screen is incident to the microstructure unit of the projection screen according to the form of the present disclosure. It is assumed that the refractive index of the microstructure layer 20 is n2, the refractive index of the layer (for example, the light absorbing layer 10 or the air gap) located at the inner side of the microstructure layer 20 is n3, and the refractive index of the layer (for example, the diffusion layer 40) located at the outer side the microstructure layer 20 is $n_1$. In addition, it is assumed that the angle between the incident projection light and the horizontal direction is $\alpha$, the angle between the outgoing projection light and the horizontal direction is $\beta$, the angle between the tangent line of a certain point on the lens surface 22 and the vertical direction (the direction parallel to the plane of the screen) is $\theta_1$, the angle between the reflective surface 21 and the vertical direction (the direction parallel to the plane of the screen) is $\theta_2$. Then, from the geometric relation and optical principle, we can obtain:

$$\theta_1 + \theta_2 = \frac{180 - (\alpha + \beta)}{2}, \tag{1}$$

$$\cos(\theta_1 + \alpha) < \sqrt{1 - \left(\frac{n_3}{n_2}\right)^2}, \text{ and} \tag{2}$$

$$\cos(\theta_2 + \beta) < \sqrt{1 - \left(\frac{n_3}{n_2}\right)^2}. \tag{3}$$

In the application of ultra-short throw projection, the projector is located below the screen, so the incident angle $\alpha > 0$ is always true; and the eyes of the viewer are located above the projector, so the condition $\alpha + \beta > 0$ can also be satisfied. From formula (1), we can obtain:

$$\theta_1 + \theta_2 < 90° \tag{4}$$

Therefore, in each total internal reflection microstructure unit, the angle between the tangent line at any point on the lens surface 22 and the extension line of the reflective surface 21 needs to be an obtuse angle. In addition, in actual application scenarios, viewers generally watch the screen in a relatively large horizontal view field and a relatively small vertical view field, and the horizontal view angle of the screen is generally expected to satisfy certain viewing requirements, but there is no strict requirements for the upright view angle. Therefore, in order to provide that the gain of the screen is not affected, the upright view angle needs to be limited. Therefore, it is assumed that the maximum exiting angle in the upright direction is $\beta_c$, and it satisfies:

$$\beta < \beta_c \tag{5}$$

According to formula (3) and formula (4), we can obtain:

$$\theta_2 > \arccos\sqrt{1 - \left(\frac{n_3}{n_2}\right)^2} - \beta_2, \text{ and} \tag{6}$$

$$\theta_1 < 90° - \arccos\sqrt{1 - \left(\frac{n_3}{n_2}\right)^2} + \beta_c. \tag{7}$$

Based on formulas (4), (6) and (7), we can set appropriate $\theta_1$ and $\theta_2$ according to the design needs.

In addition, in order to better explain the advantageous effects of the projection screen according to the form of the present disclosure, here we define a parameter related to the anti-ambient light contrast, i.e., aperture factor AR. As shown in FIG. 4, in the upright direction, a maximum pitch of a total internal reflection microstructure unit is Pitch, a length of the reflective surface 21 is h, a length of the lens surface 22 is H, a maximum length of a part of the microstructure unit excluding the pair of total internal reflection surfaces (that is, the reflective surface 21 and the lens surface 22) is T, and $$AR = \frac{T}{\text{Pitch}}. \tag{8}$$

Figure 5A:
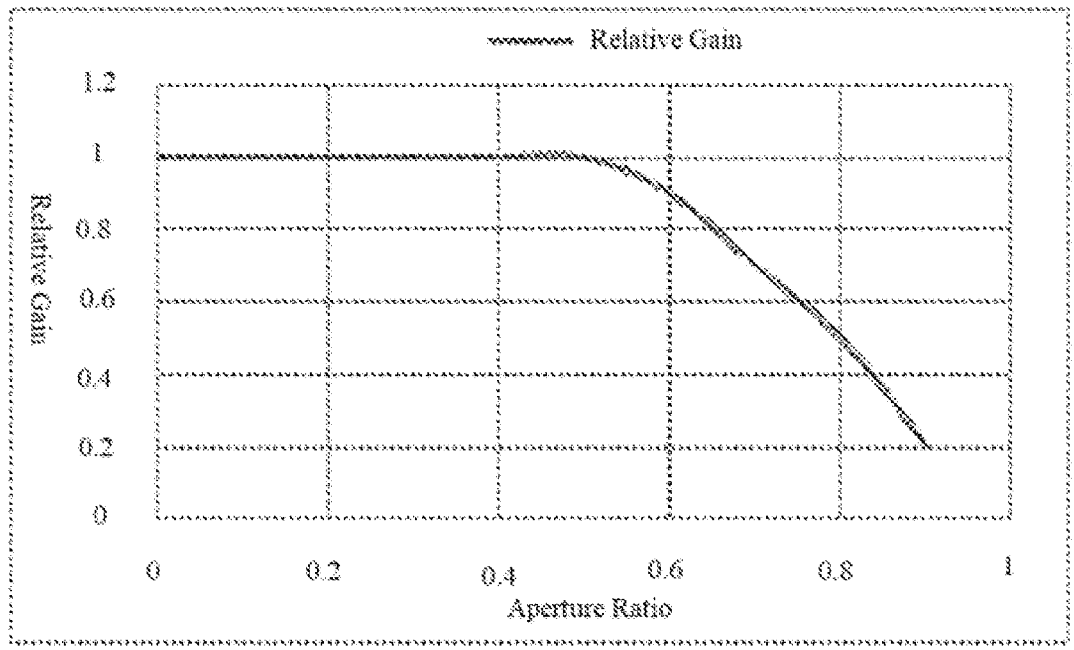
FIG. 5a shows a simulation graph of a relative gain of a projection screen simulated with different aperture ratios of a total internal reflection microstructure unit according to one form of the present disclosure.
Figure 5B:
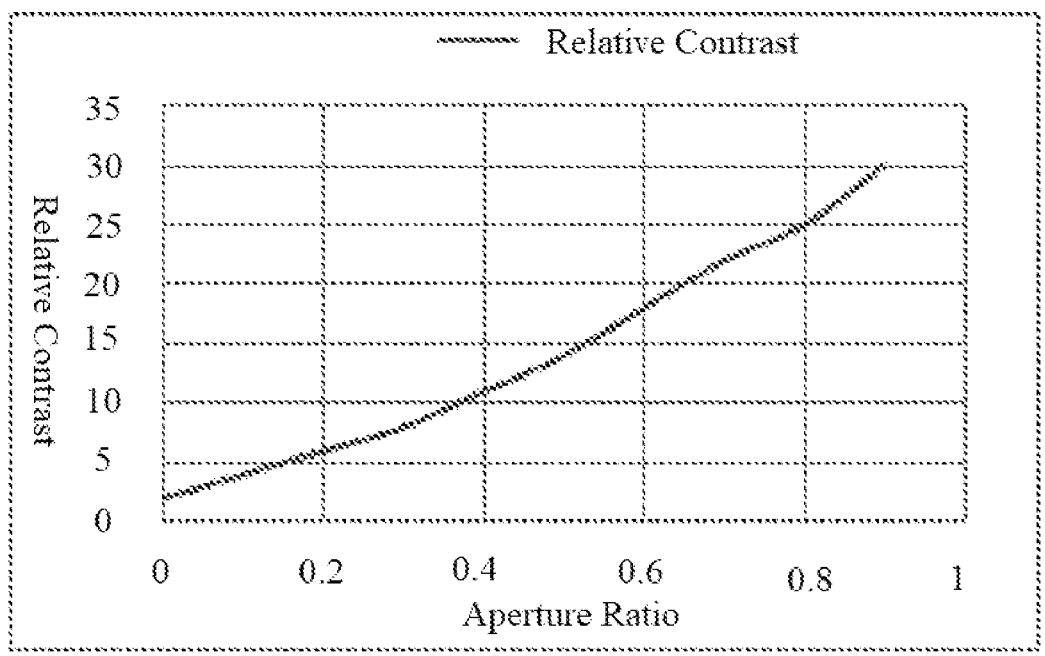
FIG. 5b shows a simulation graph of an anti-ambient light contrast of a projection screen simulated with different aperture ratios of a total internal reflection microstructure unit according to one form of the present disclosure.

FIG. 5a and FIG. 5b are simulation graphs respectively showing a relative gain and a relative anti-ambient light contrast of a projection screen simulated with different aperture ratios of a total internal reflection microstructure unit according to a projection screen of one form of the present disclosure. It can be seen from FIG. 5a that when the aperture factor increases from 0, the screen's gain for projection light does not change significantly due to the light-converging effect of the lens surface, and only when the aperture factor AR is greater than 0.5, the gain begins to decrease. It should be noted that, for the convenience of illustration, the gain shown in FIG. 5a is a relative gain relative to a gain when the aperture factor is 0, and is not an actual gain. Similarly, the contrast shown in b of FIG. 5 is also a relative contrast, not an actual contrast. In addition, as can be seen from FIG. 5b, because the ambient light comes from all directions, the anti-ambient light contrast of the screen depends on the aperture factor. The larger the aperture factor AR, the higher the proportion of the light absorbing layer, the stronger the light-absorbing ability of the screen, the more ambient light will be absorbed, and the better the anti-ambient light contrast of the screen. For the convenience of illustration, the anti-ambient light contrast shown in FIG. 5b is a relative anti-ambient light contrast relative to that when the aperture factor is 0. Therefore, according to FIG. 5a and FIG. 5b, it can be known that the range of the aperture factor AR is from 0.1 to 0.9, and when the aperture factor is within the range from 0.35 to 0.55, the gain and the effect of anti-ambient light contrast of the screen can both be improved. It should be noted that although the simulation results shown in FIG. 5a and FIG. 5b are obtained by simulating a projection screen using total internal reflection microstructure units, the aperture factor of a projection screen using specular reflective microstructure units has a basically similar impact on the gain and the anti-ambient light contrast, and the above simulation results are also applicable.

In addition, it is assumed that the reflectivity per unit area of the reflective surface 21 in each total internal reflection microstructure unit is R, the total area of the screen is S, $A_0$ is a constant, and h is the length of each reflective surface 21 in the vertical direction, then the overall average reflectivity $R_{ave}$ of the screen is:

$$R_{ave} = \frac{\Sigma A_0 h^2 R}{S}. \tag{9}$$

Combining the optical path diagram of the projection light in FIG. 3, it can be obtained that since the lens surface 22 capable of converging the projection light onto the reflective surface 21 is used in the present disclosure, the projection light beam totally internally reflected by the lens surface 22 is converged on a very small area of the reflective surface 21.

Therefore, the sizes of the reflective surface can be arranged smaller. Therefore, it can be seen from the above formula (8) that when the pitch Pitch of the total internal reflection microstructure unit and the length H of the lens surface in the upright direction remain unchanged, since h is significantly reduced, T can be appropriately increased, such that a screen with a large aperture factor AR can be provided. In addition, it can be seen from the above formula (9) that if the Pitch and T of each totally internally reflective microstructure are kept unchanged, that is, when the aperture factor AR is unchanged, since h is significantly reduced, the proportion of the reflective surface 21 in each total internal reflection microstructure unit becomes smaller, such that the overall average reflectivity $R_{ave}$ of the entire screen is reduced. Therefore, the anti-ambient light ability of the projection screen in the present disclosure is improved. In addition, since the sizes of the reflective surface 21 of the total internal reflection microstructure unit become smaller, the sizes of the lens surface increase when the Pitch and AR of the total internal reflection microstructure unit remain unchanged, which means that the area that can be used for receiving projection light is increasing. Therefore, compared with the solution in the prior art, the gain of the screen is also increased. From the above analysis, it can be seen that due to the use of the lens surface 22 and the reflective surface 21, various technical effects can be achieved according to different needs.

Figure 6:
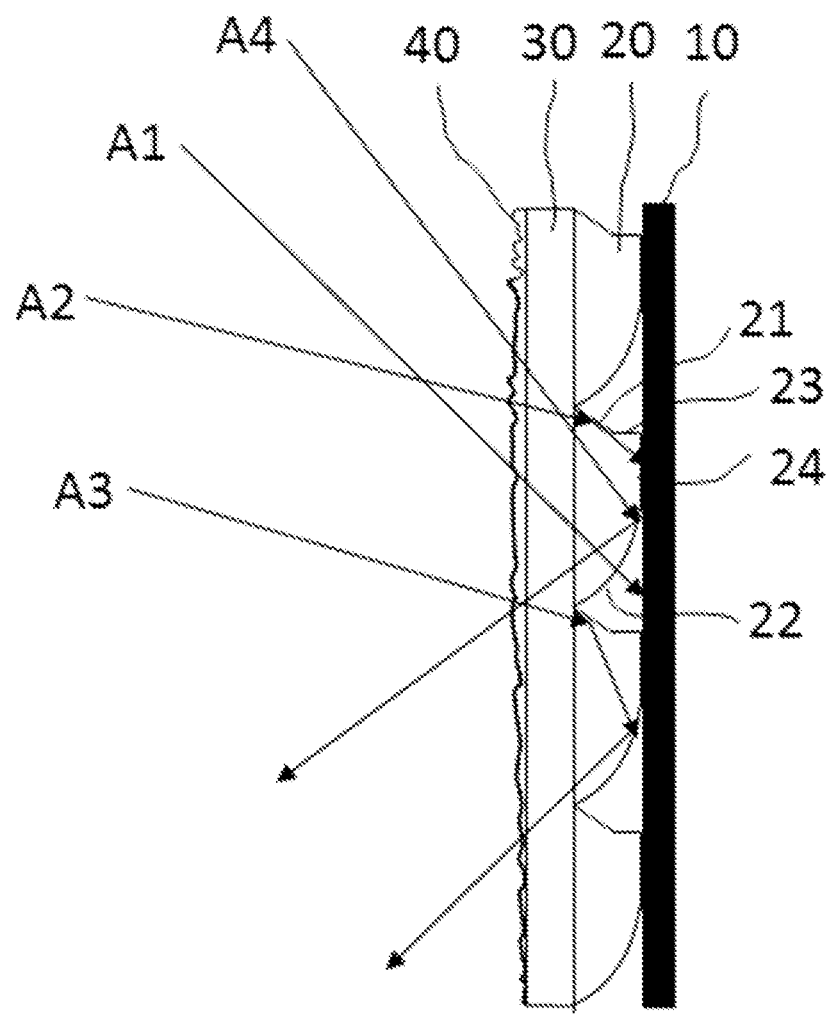
FIG. 6 is a schematic diagram showing an optical path of ambient light irradiated to the projection screen when a microstructure unit is a total internal reflection microstructure unit according to one form of the present disclosure.

In addition, FIG. 6 shows an optical path of ambient light irradiated to the projection screen according to one form of the present disclosure. As shown in FIG. 6, for example, a part A1 of top illumination light above the screen is incident on the lens surface 22 of the total internal reflection microstructure unit. Because the incident angle does not meet the totally internally reflective condition, this part of the illumination light directly passes through the lens surface 22 and is absorbed by the black light absorbing layer 10 behind; another part A2 of ambient light above the screen is first incident to the reflective surface 21, and after being totally internally reflected, this part of the illumination light is absorbed by the light absorbing layer after passing through the upright surface 24 of the total internal reflection microstructure unit. In addition, yet another part A3 of ambient light rays is first incident to the reflective surface 21, after being totally internally reflected, this part of the illumination light is incident to the lens surface 22, and then totally internally reflected by the lens surface 22 out of the view field of the viewer, for example, reflected to the ground. In addition, another part A4 is indirectly incident to the lens surface 22 and is reflected out of the view field of the viewer by the lens surface 22, for example, reflected to the ground. Incidentally, when the microstructure unit is a specular reflective microstructure unit, the above-described optical path will be slightly different. In this case, specifically, a part A1 of top illumination light above the screen is incident to the lens surface 22 of the specular reflective microstructure unit, and is reflected out of the view field of the viewer, for example, reflected to the roof, and another part A2 of ambient light rays comes from the top is first incident to the reflective surface 21 and reflected to the upright surface 24, and then is absorbed by the light absorbing layer. In addition, yet another part A3 of ambient light is first incident to the reflective surface 21, and is continuously reflected by the reflective surface 21 and the lens surface 22 and then is reflected out of the view field of the viewer, for example, to the ground. In summary, the structure of the microstructure unit of the projection screen according to the form of the present disclosure itself has a good ability of resisting ambient light.

III. Variation of Structure of Microstructure Unit

The microstructure unit with the annular arranged structure can be made on a master mold by precision lathe processing, laser engraving or microstructure development and exposure, and then made on a surface of a transparent, black or gray substrate by hot imprint or UV glue transfer method, and the substrate includes organic materials such as PET, PC, PVC, and PMMA.

As described above, each microstructure unit includes a reflective surface 21 and a lens surface 22. The reflective surface 21 and the lens surface 22 form a pair of reflection surfaces of the microstructure unit. In addition, each microstructure unit can also include a connecting surface for connecting the reflective surface 21 with the lens surface 22. Regarding the connecting surface, in addition to the case of including a horizontal surface 23 and an upright surface 24 as shown in FIGS. 2 to 6, other manners can also be used. For example, FIG. 7a to FIG. 7c show another three structures of the connecting surface for the reflective surface 21 and the lens surface 22. As shown in FIG. 7a, the reflective surface 21 and the lens surface 22 are directly connected to each other by an inclined surface. As shown in FIG. 7b, the reflective surface 21 and the lens surface 22 both extend to and are in contact with the light absorbing layer, and are connected to each other by only the upright surface 24. As shown in FIG. 7c, the reflective surface 21 and the lens surface 22 directly intersect. By comparison, it can be seen that the structure including the horizontal surface 23 and the upright surface 24 in FIGS. 2 to 6 has the smallest reflective surface area, and the overall reflectivity of the screen in this structure is the lowest. In addition, since the horizontal plane 23 extends perpendicular to the plane of the screen, the ambient light is hardly irradiated the horizontal surface and undesired reflection is not generated, so the influence of ambient light on the contrast of the screen can be effectively avoided, and it is the optimal solution. The structure shown in FIG. 7a is relatively simple to process, but it will increase the reflection probability of the projection light and can have a suitable gain and a higher contrast. The structures shown in FIG. 7b and FIG. 7c are simple to process, and can make full use of projection light and have a suitable contrast and a high gain.

IV. Variation of Structure of Reflective Surface of Microstructure Unit

The reflective surface 21 of the microstructure unit may be a planar structure as shown in FIGS. 2 to 5, or may be made into a curved surface with curvature in the upright direction, so as to compress the emitted light in the upright direction, reduce the diffusion in the upright direction, and increase the gain of the screen, as shown in FIG. 8a. It should be noted that in this case, the angle $\theta_2$ discussed above can be defined as the angle between the tangent line of a certain point on the reflective surface 21 having a curvature and the upright direction (the direction parallel to the plane of the screen).

In addition, FIG. 8b also shows another variation related to the reflective surface of the projection screen according to the form of the present disclosure. As shown in FIG. 8b, the side, close to the viewer, of the substrate layer 30 used for process of the microstructure unit is further provided with a microlens array. Microlenses 31 in the microlens array are arranged in one-to-one correspondence with the microstructure units in the microstructure layer 20, and the reflective surface 21 of the microstructure unit is located on a focal plane of the corresponding microlens 31. The microlens array is configured to collimate the light beam emitted from the reflective surface 21 and reduce the diffusion in the upright direction. The outside of the microlens array can be attached by a diffusion film or the surface of the microlens array can be frosted.

V. Variation of Diffusion Layer

Figure 9A:
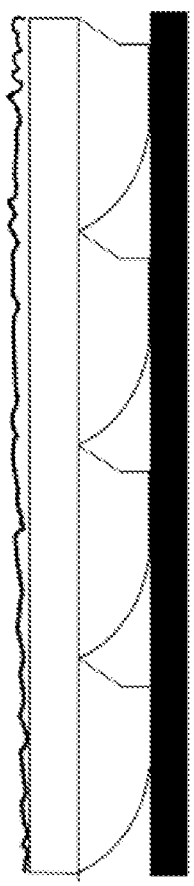
FIG. 9a shows a schematic diagram of a variant of a diffusion layer of a projection screen according to one form of the present disclosure.
Figure 9B:
FIG. 9b shows a schematic diagram of another variant of a diffusion layer of a projection screen according to one form of the present disclosure.

As described above, the projection screen according to the form of the present disclosure can include the diffusion layer 40 provided on the side of the substrate layer 30 close to the viewer, as shown in FIG. 9a. The diffusion layer 40 can be, for example, a surface diffusion layer or a bulk diffusion layer. However, the present disclosure is not limited to this. For example, the surface of the microstructure unit can be directly frosted, such that the projection light is diffused while being reflected, thereby increasing the view angle, as shown in FIG. 9b. In addition, the surface, on the side close to the viewer, of the screen, can be additionally provided with a colored layer, a protective layer, etc.

Although the above has depicted the projection screen and the projection system according to the present disclosure, the present disclosure is not limited to this. Those skilled in the art should understand that various changes, combinations, and sub-combinations and variations can be made without departing from the substance or scope of the claims.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A projection screen, comprising:
a microstructure layer and a light absorbing layer that are sequentially stacked from an incident side of projection light,
wherein the microstructure layer comprises a plurality of microstructure units, each of the plurality of microstructure units comprises a reflective surface and a lens surface opposite to the reflective surface, and the reflective surface is provided at a position matching a focus of the lens surface in such a manner that the projection light is totally internally reflected by the lens surface and then is focused on the reflective surface through the lens surface.

2. The projection screen according to claim 1, wherein the microstructure unit further comprises a connecting surface connecting the reflective surface with the lens surface.

3. The projection screen according to claim 2, wherein the connecting surface comprises an upright surface, and the upright surface is in contact with the light absorbing layer.

4. The projection screen according to claim 3, wherein the connecting surface comprises a horizontal surface directly connected to the reflective surface.

5. The projection screen according to claim 1, wherein an extension line of the reflective surface and a tangent line of any point on the lens surface of each of the plurality of microstructure units form an obtuse angle.

6. The projection screen according to claim 1, wherein in each of the plurality of microstructure units, the lens surface and the reflective surface are a pair of total internal reflection surfaces provided for the projection light.

7. The projection screen according to claim 1, wherein in each of the plurality of microstructure units, each of the lens surface and the reflective surface is plated with a reflective layer.

8. The projection screen according to claim 1, wherein the lens surface has a curvature in an upright direction.

9. The projection screen according to claim 1, wherein the plurality of microstructure units are distributed in a shape of annulus or a sector of an annulus in a rotational symmetry manner in a plane of the projection screen.

10. The projection screen according to claim 1, further comprising:
a microlens array located on a light incident side of the plurality of microstructure units, wherein the microlens array comprises a plurality of microlenses, the plurality of microlenses is arranged in one-to-one correspondence with the plurality of microstructure units, and the reflective surface of each of the plurality of microstructure units is located on a focal plane of a corresponding microlens of the plurality of microlenses.

11. The projection screen according to claim 10, wherein a surface of the microlens array is frosted.

12. The projection screen according to claim 1, further comprising:
a diffusion layer located on a light incident side of the microstructure layer.

13. The projection screen according to claim 1, wherein a surface of each of the plurality of microstructure units is frosted.

14. The projection screen according to claim 1, wherein the reflective surface has a curvature in an upright direction.

15. The projection screen according to claim 1, wherein assuming that a maximum pitch of each of the plurality of microstructure units is Pitch, and that a maximum length of a part of the microstructure unit excluding the reflective surface and the lens surface is T, an aperture factor AR of the microstructure unit is:

$$AR = \frac{T}{\text{Pitch}},$$

wherein a value of the aperture factor AR is within a range from 0.1 to 0.9.

16. The projection screen according to claim 15, wherein a value of the aperture factor AR is within a range from 0.35 to 0.55.

17. A projection system, comprising:
a projection screen; and
a projector,
wherein the projection screen comprises a microstructure layer and a light absorbing layer that are sequentially stacked from an incident side of projection light,
wherein the microstructure layer comprises a plurality of microstructure units, each of the plurality of microstructure units comprises a reflective surface and a lens surface opposite to the reflective surface, and the reflective surface is provided at a position matching a focus of the lens surface in such a manner that the projection light is totally internally reflected by the lens surface and then is focused on the reflective surface through the lens surface.

18. The projection system according to claim 17, wherein an extension line of the reflective surface and a tangent line of any point on the lens surface of each of the plurality of microstructure units form an obtuse angle.

19. The projection system according to claim 17, wherein in each of the plurality of microstructure units, the lens surface and the reflective surface are a pair of total internal reflection surfaces provided for the projection light.

20. The projection system according to claim 17, wherein assuming that a maximum pitch of each of the plurality of microstructure units is Pitch, and that a maximum length of a part of the microstructure unit excluding the reflective surface and the lens surface is T, an aperture factor AR of the microstructure unit is:

$$AR = \frac{T}{\text{Pitch}},$$

wherein a value of the aperture factor AR is within a range from 0.1 to 0.9, preferably 0.35 to 0.55.

* * * * *